H. P. GRAVES.
VALVE GEAR.
APPLICATION FILED MAY 16, 1910.
978,737.
Patented Dec. 13, 1910.
2 SHEETS—SHEET 1.
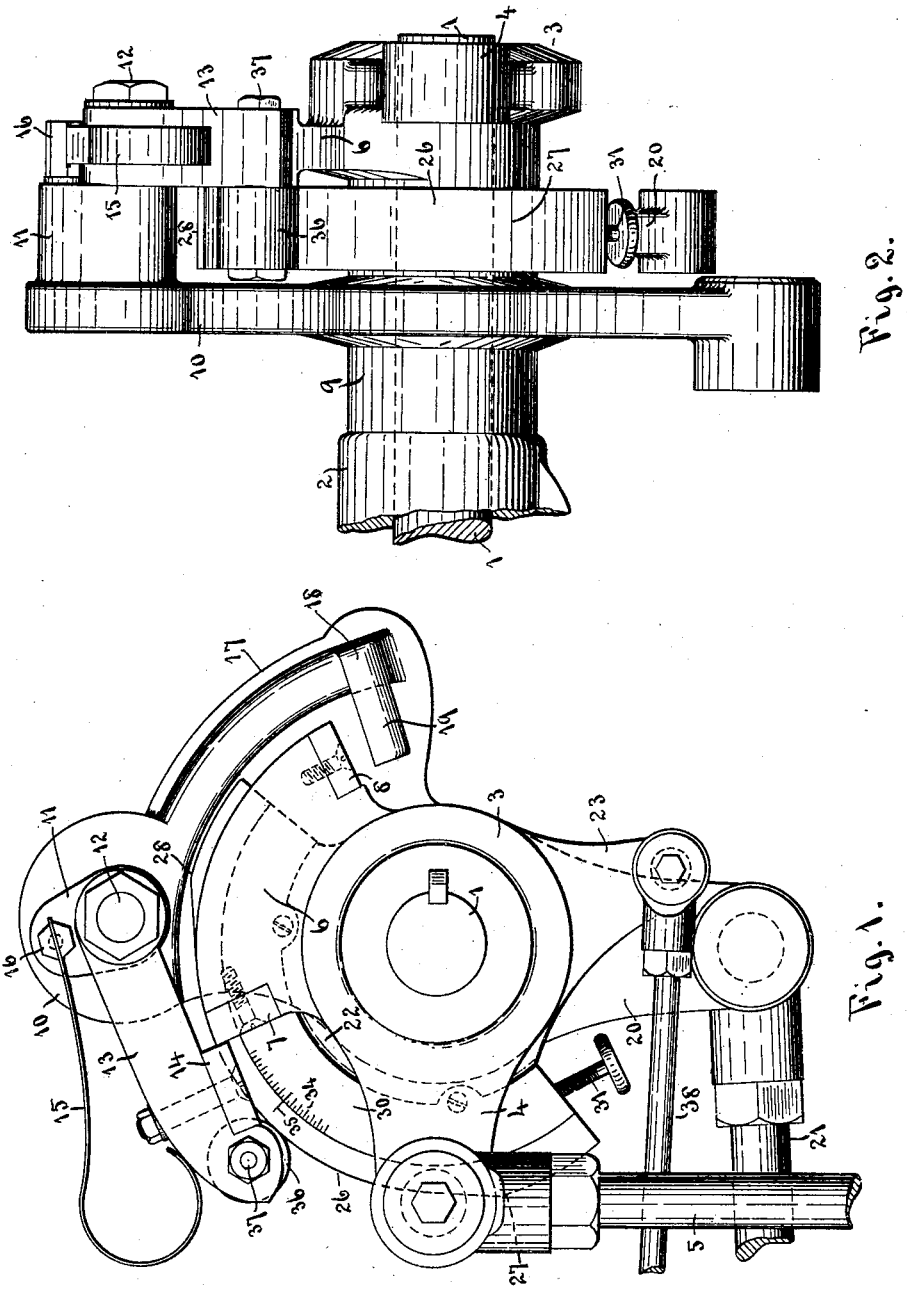
WITNESSES:
INVENTOR
Hiram P. Graves
BY
Eugene Owen
ATTORNEY H. P. GRAVES.
VALVE GEAR.
APPLICATION FILED MAY 16, 1910.
978,737.
Patented Dec. 13, 1910.
2 SHEETS—SHEET 2.
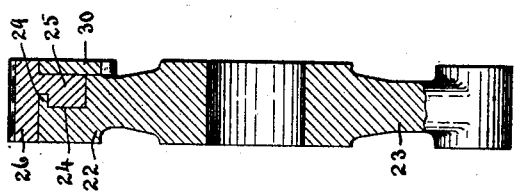
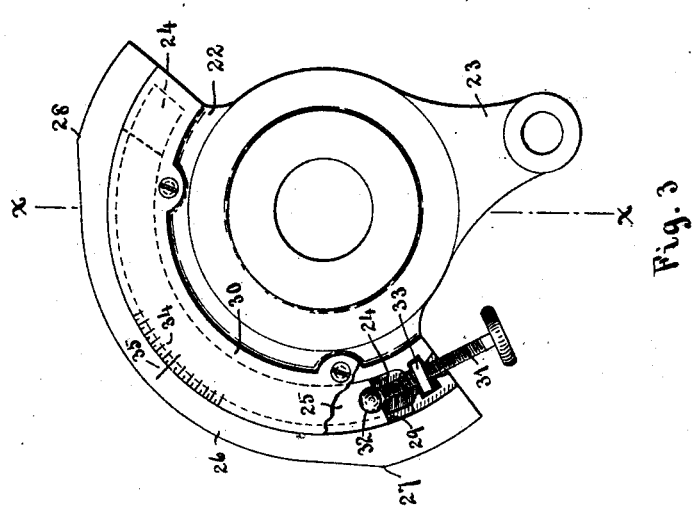
WITNESSES:
INVENTOR
Hiram P. Graves
BY Eugene Diven
ATTORNEY

UNITED STATES PATENT OFFICE.

HIRAM P. GRAVES, OF ELMIRA HEIGHTS, NEW YORK.

VALVE-GEAR.

978,737.  Specification of Letters Patent.  Patented Dec. 13, 1910.

Application filed May 16, 1910. Serial No. 561,540.

*To all whom it may concern:*

Be it known that I, HIRAM P. GRAVES, a citizen of the United States, residing at Elmira Heights, in the county of Chemung and State of New York, have invented certain new and useful Improvements in Valve-Gears, of which the following is a specification.

This invention relates to improvements in valve gear for engines of the Corliss type; and my object is to provide cut-off mechanisms for the admission valves which will operate effectively with engines running at high speeds; and, furthermore, to provide means for readily setting the cut-off cam for different points of cut-off, and for so arranging the cam adjusting device that it may be operated to shift the cam, even when the engine is running.

I attain my objects by constructing the valve gear in the manner illustrated in the accompanying drawings, in which—

Figure 1 presents a side elevation of my improved gear, as applied to one of the admission valves; Fig. 2, an end view thereof; Fig. 3, a side elevation of the cut-off cam removed; and Fig. 4, a section of said cam on the line x—x in Fig. 3.

Like numerals designate like parts in the several views.

To the valve stem 1, which projects beyond the usual out board bearing 2, I fasten a hub 3, provided with an arm 4, to which is coupled the dashpot connecting rod 5. The hub 3 is also provided with a segment shaped lever 6, at opposite ends of which are fastened blocks 7 and 8; the one of steel to receive the latch, and the other of fiber, to engage a stop 19, carried by the rocker arm 10, as and for the purpose hereinafter described. The rocker arm 10 is carried upon a hub 9, loosely mounted on the valve stem next to the bearing 2.

At 11 the rocker arm is provided with an offset carrying a pivot pin 12, upon which the latch 13 is mounted above the valve lever 6. This latch is provided at 14 with a steel block adapted to engage the block 7 on the lever 6.

At 20 the rocker arm is provided with a lever to which is coupled the shackle rod 21, by which connection is made with a wrist-plate operated in the usual manner by the eccentric on the engine shaft.

Between the hubs 3 and 9 on the stem 1, is loosely mounted the cut-off cam 22, provided at 23 with an arm by which the cam is coupled, by means of a reach rod 38, to the governor. This cam is made in two parts, the outward part 26 consisting of a segmental block adapted to slide on the body part 22 of the cam. This sliding connection between the two parts consists of an annular recess 24 formed in the body portion, into which is fitted a corresponding lug 25 on the block 26. A tongue and groove joint 29 and a cover-plate 30 fastened to the body portion 22 hold the lug 25 within the recess 24. At one end of the recess 24 there is mounted an adjusting screw 31, coupled at its inward end to the lug 25, by means of a ball and socket joint at 32. A nut 33 receives the screw 31, said nut being held from turning in a suitable chamber formed adjacent one end of the recess 24, and inclosed by the coverplate 30. The nut is so mounted in this chamber as to have the necessary play to accommodate the swing of the adjusting screw, as it moves the cam block forward and back. The cam block face is provided at opposite ends with portions of larger radius, as at 27 and 28, approached by plane surfaces tangent to the surface of smaller radius, whereby the latch will be released from engagement with the valve lever 6. In order to note the degree of adjustment of the cam block I provide the coverplate with a scale at 34, and the cam block with an index mark at 35.

The latch 13, at its outward end, is provided with a roller outrider 36, mounted upon a pin 37, said roller engaging the face of the cam block to actuate the latch to engage and release the lever 6. The weight of the latch will be sufficient to hold the roller in engagement with the cam block to actuate the latch; but, for additional insurance of such engagement, I provide a light spring 15, which presses downward upon the outward end of the latch, said spring being fastened by a slotted cap screw 16 to the offset 11 on the rocker arm 10. The rocker arm is provided with an extension 17, from which an offset 18 projects into line with the lever 6, a stop 19 extending radially inward from said offset to engage the block 8, whereby the valve will be closed in case the dashpot fails to work. The stop 19 is spaced away from the rocker arm so that the cut-off cam may be free to pass through should any disarrangement of the parts cause the rocker arm to swing beyond its normal travel.

In operation, the oscillation of the wristplate causes the rocker arm to swing back and forth, carrying with it the latch 13. As the parts are shown illustrated in Fig. 1, the latch has engaged the valve lever 6; and, as the rocker arm swings to the right, the dashpot connection will be lifted, and the valve stem turned to open the valve ports. As the latch is carried over to the right the outrider 36, when it reaches the point 28 on the cut-off cam, will raise the latch and release the valve, which will then be closed by the action of the dashpot. This point of release will be varied automatically by the action of the governor which, through the reach rod 38 and the arm 23, acts to shift the cut-off cam forward and back to advance or retard the point of release through certain prescribed limits. Should, however, it be desired to change the point of cut-off without changing the governor connections, this may be readily done by moving the cam block 26 to the right or left by means of the adjusting screw 31; and as this part of the gear is practically stationary at all times this adjustment may be made when the engine is running, even at high speeds. It will thus be seen that a very fine adjustment of the valve gear may be attained, and in such a manner that the effect upon the engine may be observed while the adjustment is being made.

The approach from the low part of the cam to the high part 28 is preferably a straight line tangent to the curve of the low part. The rise and fall of the latch will, therefore, be gradual, thus eliminating all shock of release and engagement, as where the latch is thrown in and out rapidly. Moreover, by providing a roller on the outrider friction is reduced to a minimum, and the latch will operate smoothly, quickly and without noise. On the return swing of the rocker arm, the outrider rolls down to the low part of the cam and rests thereover until the latch again drops into engagement with block 7. To release the latch, in case of breakage or disarrangement of the gear connections, I provide a high part on the cam at 27.

What I claim as my invention and desire to secure by Letters Patent is:—

1. The combination, in a Corliss valve gear, of a valve lever fastened upon a valve stem, a dash pot connection to which said lever is coupled, a rocker arm loosely mounted upon the valve stem, means for oscillating said arm, a cut-off cam loosely mounted on the valve stem by the side of rocker arm, means actuated by a governor for adjusting said cam to different points of cut-off, a gravity latch pivotally mounted upon the rocker arm in position to engage the valve lever, and an outrider projecting laterally from the free end of the latch in engagement with the cut-off cam.

2. The combination, in a Corliss valve gear, of a valve lever fastened upon a valve stem, a dash pot connection to which said lever is coupled, a rocker arm loosely mounted upon the valve stem, means for oscillating said arm, a cut-off cam loosely mounted on the valve stem by the side of rocker arm, said cam having two curved surfaces of different diameters joined by a plane surface tangent to the surface of smaller diameter, means actuated by a governor for adjusting said cam to different points of cut-off, a gravity latch pivotally mounted upon the rocker arm in position to engage the valve lever, and an outrider projecting laterally from the free end of the latch in engagement with the cut-off cam.

3. The combination, in a Corliss valve gear, of a valve lever fastened upon a valve stem, a dash pot connection to which said lever is coupled, a rocker arm loosely mounted upon the valve stem, means for oscillating said arm, a cut-off cam loosely mounted on the valve stem by the side of rocker arm, means actuated by a governor for adjusting said cam to different points of cut-off, means for adjusting the cam to advance or retard the point of cut-off independent of the governor, a latch mounted upon the rocker arm in position to engage the valve lever, and means actuated by the cam for causing the latch to grip and release the valve lever.

4. The combination, in a Corliss valve gear, of a valve lever fastened upon a valve stem, a dash pot connection to which said lever is coupled, a rocker arm loosely mounted upon the valve stem, means for oscillating said arm, a cut-off cam loosely mounted on the valve stem by the side of rocker arm, means actuated by a governor for adjusting said cam to different points of cut-off, means for adjusting the cam to advance or retard the point of cut-off independent of the governor, said means being operable while the engine is running, a latch mounted upon the rocker arm in position to engage the valve lever, and means actuated by the cam for causing the latch to grip and release the valve lever.

5. In a Corliss valve gear, a cut-off cam of segmental form in two parts, a rim portion carrying the cam surfaces, and a body portion upon which said rim is circumferentially adjustable.

6. In a Corliss valve gear, a cut-off cam of segmental form in two parts, a rim portion carrying the cam surfaces, and a body portion having a groove with which the rim is slidably connected, means for holding the two parts together, and an adjusting screw projecting from one end of said groove and coupled to the rim portion within the groove.

In testimony whereof I have affixed my signature, in presence of two witnesses.

HIRAM P. GRAVES.

Witnesses:
M. E. VERBECK,
EUGENE DIVEN.